March 28, 1950 T. BEWLEY ET AL 2,501,708
PRODUCTION OF BUTYRALDEHYDE
Filed June 19, 1946
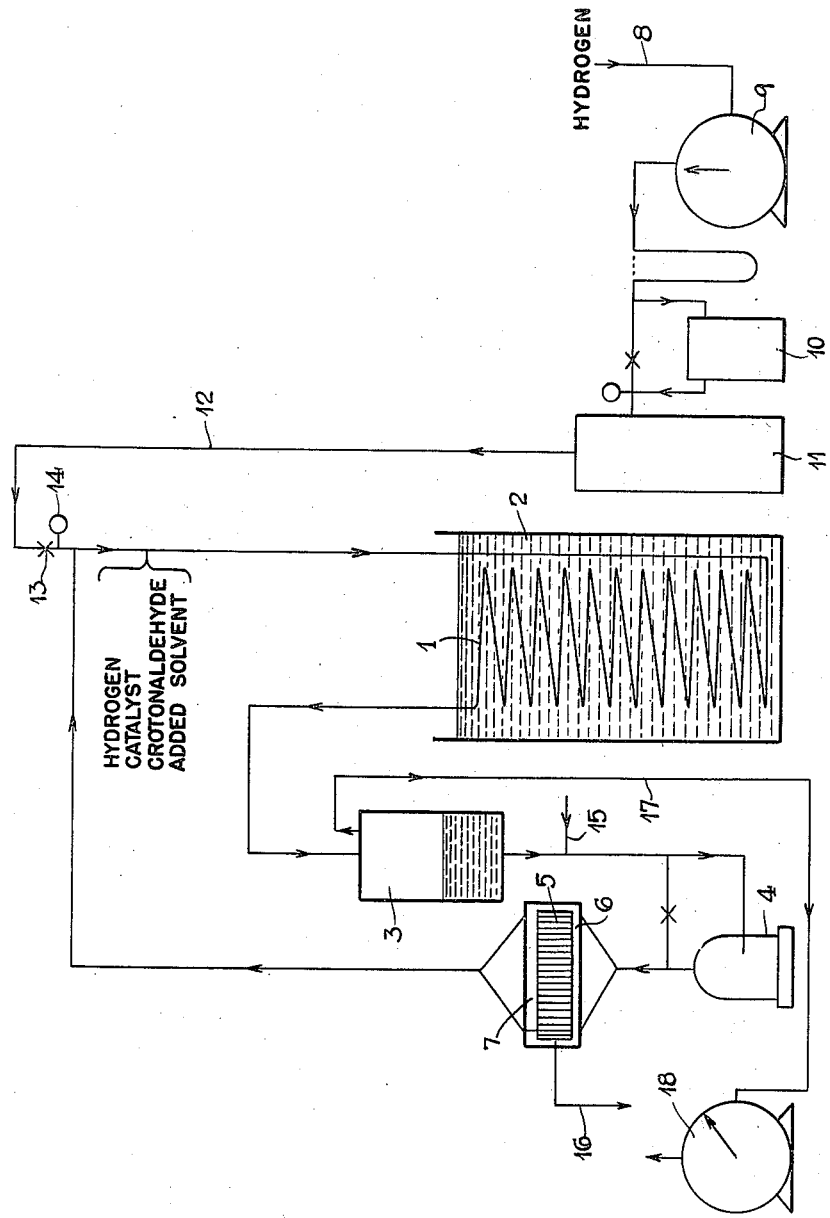
INVENTORS.
THOMAS BEWLEY.
JOHN ALFRED KEEBLE.
BY
ATTORNEYS.

Patented Mar. 28, 1950

2,501,708

UNITED STATES PATENT OFFICE 2,501,708

PRODUCTION OF BUTYRALDEHYDE

Thomas Bewley and John Alfred Keeble, Epsom, England, assignors to The Distillers Company, Limited, Edinburgh, Scotland, a British company Application June 19, 1946, Serial No. 677,834
In Great Britain July 10, 1945

16 Claims. (Cl. 260—601)

This invention relates to a continuous process for the manufacture of butyraldehyde by hydrogenation of crotonaldehyde in the liquid phase in the presence of a nickel catalyst, such as Raney nickel, at low temperatures.

Crotonaldehyde, as obtained technically, normally contains a certain amount of dissolved water, and in view of the difficulties and losses experienced in drying this wet crotonaldehyde, it is an advantage if such wet crotonaldehyde can be used as starting material for chemical reactions. However, we have found that the rate of hydrogenation of wet crotonaldehyde decreases rapidly when a nickel catalyst, such as Raney nickel, is used at temperatures of less than 60° C., the temperature being chosen so low in order to minimize the formation of high-boiling condensation products.

We have now discovered that this decrease in activity of the catalyst is due to the separation of water from the liquid reaction mixture due to the lower solubility of water in the butyraldehyde produced.

According to the present invention, there is provided a process for the manufacture of butyraldehyde by the catalytic hydrogenation of crotonaldehyde, in the liquid phase, in the presence of a nickel catalyst which comprises hydrogenating crotonaldehyde, containing more water than can be retained in solution in the final liquid reaction mixture, at a temperature not in excess of 60° C. in the presence of an inert mutual solvent for water, crotonaldehyde and butyraldehyde, in an amount at least sufficient to maintain the liquid reaction mixture homogeneous throughout the reaction. By the addition of the inert mutual solvent to the reaction mixture in at least such quantities that no precipitation of water occurs, the activity of the catalyst can be maintained continuously at a high level, even if the concentration of crotonaldehyde drops to a very low value, e. g. 1% by weight of the liquid reaction mixture, and the butyraldehyde concentration rises to a correspondingly high figure. The solubility of water in butyraldehyde at 25° C. is 4.35% (by weight) whereas the solubility of water in crotonaldehyde at 25° C. is 9.8%. The present process, therefore, enables the continuous hydrogenation of crotonaldehyde to butyraldehyde to be carried out when crotonaldehyde containing more than 4.35% of water is employed. This process makes it possible to carry out an economical continuous process for the hydrogenation of wet crotonaldehyde to butyraldehyde at temperatures below 60° C. with a high conversion of crotonaldehyde to butyraldehyde and without substantial formation of butanol or high-boiling condensation products.

After some time, the efficiency of the catalyst begins to decline and at the same time it becomes less liable to promote the formation of byproducts; we have found that we can raise the temperature in the reaction mixture above that prescribed for the ordinary working of the process, even up to 80° C. thus making it possible to maintain the activity of the catalyst and thereby the rate of the conversion of the crotonaldehyde into butyraldehyde at its previous level for a considerably prolonged time, without increasing the amount of undesirable by-products.

According to a feature of our invention, therefore, the hydrogenation of crotonaldehyde with gaseous hydrogen is carried out in the presence of a finely-divided nickel catalyst of the Raney nickel type while continuously feeding to the reactor, crotonaldehyde, containing at least 4.35% by weight of water, together with the inert mutual solvent, in such proportions that the liquid phase consists mainly of butyraldehyde and remains homogeneous, and continuously withdrawing, through a filter, part of the liquid reaction mixture, at such a rate that the concentration of crotonaldehyde in the liquid reaction mixture does not exceed 10% by weight, the catalyst being maintained suspended in the liquid reaction mixture within the reactor.

We prefer to carry out the hydrogenation in such a way that the ratio of butyraldehyde to crotonaldehyde in the reaction mixture is at least 5:1 and is preferably considerably greater than this figure e. g. from about 15:1 to about 20:1.

As the inert mutual solvent we prefer to use n-butanol, but other inert mutual solvents, such, for example, as other alcohols, glycols, glycolethers, and dioxane, which increase the solubility of water in the liquid reaction mixture, may advantageously be employed. Thus, for example when using n-butanol as solvent and crotonaldehyde saturated with water at a conversion of crotonaldehyde of 95%, i. e. with less than 5% by weight of crotonaldehyde and with 10% by weight of water in the liquid reaction mixture, the remainder consisting mainly of butyraldehyde, we may employ at least 15% by weight of n-butanol.

It is known from prior Specification No. 371,051 that dry crotonaldehyde can be continuously hydrogenated and, from German Patent Specification No. 704,663, that wet crotonaldehyde may also be used for this purpose. In both cases, however, a high concentration of crotonaldehyde was maintained in the reaction mixture so that the water could be retained in solution and, in the latter case, the butyraldehyde was continuously evaporated from the liquid reaction mixture. In neither of these known processes, however, was the hydrogenation carried out in such a way that a liquid reaction mixture consisting mainly of butyraldehyde was obtained. On the other hand, in United States Specification No. 1,730,587, which describes a batch hydrogenation of crotonaldehyde, it is shown that at low crotonaldehyde concentrations the rate of hydrogenation slows down considerably, even though the amount of water present in the liquid reaction mixture is apparently less than its solubility limit in butyraldehyde, and results in a high yield of high-boiling condensation products. It is therefore surprising that by the use of an inert mutual solvent, such as n-butanol, the hydrogenation can be effected on a continuous scale in the presence of a considerable proportion of water, i. e. in excess of the amount which could be retained in solution in the mixed aldehydes, at a satisfactory rate and without the formation of substantial amounts of by-products in spite of the high butyraldehyde concentration in the liquid reaction mixture.

It is also known that dry crotonaldehyde can be hydrogenated in the presence of platinum black and in the presence of ether as solvent, at room temperature, whereby a reaction product containing a high proportion of butanol was obtained. However, ether dissolves only a very small proportion of water and is not a satisfactory solvent when appreciable quantities of water are present in the reaction mixture. Furthermore, Delepine (Bull. Soc. Chim. (4), 7, 24, 1910) obtained results which indicate that, with increase of the butyraldehyde content of the liquid reaction mixture, the rate of absorption of hydrogen decreased considerably.

The hydrogenation can be carried out in a vessel of the type usually used for hydrogenations, in which hydrogen is brought into intimate contact with the reaction mixture.

The liquid reaction mixture is withdrawn from the reactor through a filter whereby the separation of the catalyst from the liquid reaction mixture is effected. The filter is arranged in the reactor or in a continuous recycling system associated therewith in such a manner that the catalyst is continuously washed from the filter surface and is thus kept suspended in the reaction mixture by the rapid movement of the liquid reaction mixture over its surface brought about either by the agitation in the reactor necessary for the hydrogenation or by the rapid circulation of the liquid reaction mixture in the recycling system. In this way, the time of contact between the liquid reaction mixture and the catalyst is restricted to a minimum, and moreover the disadvantages involved in removing the liquid reaction mixture from the reaction system for a separate filtration step for filtering off the easily ignitable catalyst are avoided. We have, however, found that in order to facilitate filtration, it is advisable to add, to the liquid reaction mixture, a small amount of a filter aid, e. g. kieselguhr, preferably in an amount up to 5% by weight of the liquid reaction mixture in the reactor.

The hydrogenation can be carried out at normal or increased pressure. It is, however, a special advantage of the present process that normal or only slightly increased pressures are sufficient to effect a satisfactory rate of hydrogenation. By carrying out the hydrogenation in a narrow tube, through which the liquid reaction mixture, together with hydrogen, is passed at high velocity, the rate of hydrogenation may be further increased and consequently the time that the aldehydes are exposed to any secondary action of the catalyst is reduced. In this case, the liquid reaction mixture is preferably circulated through the narrow tube by means of a suitable pump, whilst hydrogen is pumped into the system at the entrance to the reaction tube. The unchanged hydrogen is separated from the liquid in a separator (consisting of a wide pot) from which the liquid flows back to the circulation pump. In the continuous operation, part of the liquid reaction mixture is continuously withdrawn through a filter device inserted at a point between the pressure side of the liquid pump and the hydrogen inlet so that the catalyst is removed from the withdrawn reaction product and the latter is recovered free from said catalyst, which thus remains practically completely in the recycling system without coming into contact with air. This filter may consist of a filter candle enclosed in a jacket of such a size that the velocity of the circulating liquid which passes through the jacket is high enough to prevent substantial amounts of the catalyst (and filter aid, if any) from adhering to the surface of the filter candle so that the catalyst is maintained continuously in circulation. With the usual type of Raney nickel catalyst we have found that for this purpose a linear velocity of at least 2 feet per second over the filter candle is advisable.

The following example illustrates one way in which the invention may be carried into effect, reference being made to the accompanying diagrammatic drawing of the apparatus used the quantities and percentages quoted being by weight unless otherwise specified.

The apparatus used for the hydrogenation comprised a glass tube 1 of ½" internal diameter and approximately 40 feet long, having a volume of 2 litres, formed into a coil having a vertical axis, through which the reaction mixture was circulated at a rate of 12 litres of liquid per minute, which corresponds to a linear rate of liquid flow, assuming no gas phase to be present, of about 5 feet per second. The coil was immersed in a water bath 2, the temperature of which was so regulated that, in the reaction mixture, a temperature of 30° to 32° C. was maintained. As indicated above, the coil 1 was connected with a small separator pot 3 and a liquid circulating pump 4. Between the pump 4 and coil 1 was connected a cylindrical filter candle 5 enclosed in a jacket 6 of such a size that the liquid passed through the annulus 7 so formed at a linear velocity of 5 feet per second. The free annular space had a cross-sectional area of 0.2 square inch.

The plant was charged with a mixture of 72% butyraldehyde, 4.5% crotonaldehyde, 15% n-butanol and 8.5% water together with 3.8 parts of Raney nickel prepared according to the method described by H. Adkins in "Reactions of Hydrogen with Organic Compounds over Copper-Chromium Oxide and Nickel Catalysts," 1937 (University of Wisconsin), on page 20 (which was further modified by treatment with dilute acetic acid), and 2.5 parts of filter aid for every 100 parts of liquid charge.

Hydrogen was introduced into the system at 8, and was passed through a meter 9, gas compressor 10, reservoir 11, pipe 12 and control valve 13 at 7–10 lbs. gauge pressure as shown on the gauge located at 14 at a point prior to the entry of the circulating liquid into the coil 1 while at the same time a mixture of 76.5% crotonaldehyde, 8.5% water and 15% n-butanol was fed in at a point 15 between the separator pot 3 and the circulation pump 4 at such a rate that 95% of the crotonaldehyde was converted. After the operation had attained a steady state, a catalyst-free product was a continuously withdrawn at 16, through the filter 5, which consisted approximately of 67.8% butyraldehyde, 4.6% crotonaldehyde, 15.9% butanol, 3% high-boiling products and 8.7% water, unused hydrogen being removed from the separator 3 through pipe 17 and exit meter 18.

Of the crotonaldehyde converted, 94.5% was recovered as butyraldehyde, the production rate being 0.5 lb. of butyraldehyde per hour per litre of coil volume.

If the n-butanol was omitted, the initial rate of hydrogenation was only 50% of that obtained as described above and it rapidly fell to 15% when only 20% of the crotonaldehyde was converted. It further fell to zero in a comparatively short time. A continuous process with high conversion of crotonaldehyde was thus impossible under these conditions.

What we claim is:

1. A process for the manufacture of butyraldehyde by the catalytic hydrogenation of crotonaldehyde in the liquid phase in the presence of a nickel catalyst, which comprises hydrogenating wet crotonaldehyde at a temperature not in excess of 60° C. in the presence of an added inert mutual solvent for water, crotonaldehyde and butyraldehyde, said wet crotonaldehyde containing more water than could be retained in solution in the final liquid reaction mixture in the absence of said mutual solvent and said mutual solvent being present in an amount at least sufficient to maintain the liquid reaction mixture homogeneous throughout the reaction.

2. A process according to claim 1 wherein the reaction temperature is raised, as the activity of the catalyst declines, to a value not exceeding 80° C.

3. A process for the production of butyraldehyde which comprises hydrogenating wet crotonaldehyde, in the liquid phase in the presence of a nickel catalyst of the Raney nickel type at a temperature not in excess of 60° C. in the presence of an added inert mutual solvent for water, crotonaldehyde and butyraldehyde, said wet crotonaldehyde containing more water than could be retained in solution in the final liquid reaction mixture in the absence of said mutual solvent and said mutual solvent being present in an amount at least sufficient to maintain the liquid reaction mixture homogeneous throughout the reaction.

4. A continuous process for the production of butyraldehyde which comprises introducing hydrogen into a recirculating reaction system containing a liquid reaction mixture comprising crotonaldehyde, butyraldehyde, water, a nickel catalyst and an inert mutual solvent for crotonaldehyde, butyraldehyde and water whilst maintaining the temperature of the reaction mixture below 60° C., continuously feeding into the reaction system both wet crotonaldehyde containing more water than could be retained in solution in said liquid reaction mixture in the absence of said inert mutual solvent and said inert mutual solvent in such proportions that the circulating reaction mixture remains substantially constant in composition, contains mainly butyraldehyde and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

5. A continuous process for the production of butyraldehyde which comprises introducing hydrogen into a recirculating reaction system containing a liquid reaction mixture comprising crotonaldehyde, butyraldehyde, water, a nickel catalyst and an inert mutual solvent for crotonaldehyde, butyraldehyde and water whilst maintaining the temperature of the reaction mixture below 60° C., continuously feeding into the reaction system both wet crotonaldehyde containing more water than could be retained in solution in said liquid reaction mixture in the absence of said inert mutual solvent and said inert mutual solvent in such proportions that the circulating reaction mixture remains substantially constant in composition, contains butyraldehyde and crotonaldehyde in a ratio of at least five to one and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

6. A continuous process for the production of butyraldehyde which comprises introducing hydrogen into a recirculating reaction system containing a liquid reaction mixture comprising crotonaldehyde, butyraldehyde, water, a nickel catalyst and an inert mutual solvent for crotonaldehyde, butyraldehyde and water whilst maintaining the temperature of the reaction mixture below 60°, continuously feeding into the reaction system both wet crotonaldehyde containing more water than could be retained in solution in said liquid reaction mixture in the absence of said inert mutual solvent and said inert mutual solvent in such proportions that the circulating reaction mixture remains substantially constant in composition, contains butyraldehyde and crotonaldehyde in a ratio of between about fifteen and about twenty to one and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

7. A continuous process for the production of butyraldehyde which comprises introducing hydrogen into a recirculating reaction system containing a liquid reaction mixture comprising crotonaldehyde, butyraldehyde, water, a Raney nickel type catalyst and an inert mutual solvent for crotonaldehyde, butyraldehyde and water, whilst maintaining the temperature of the reaction mixture below 60° C., continuously feeding into the reaction system both wet crotonaldehyde containing more water than could be retained in solution in said liquid reaction mixture in the absence of said inert mutual solvent and said inert mutual solvent in such proportions that the circulating reaction mixture remains substantially constant in composition, contains butyraldehyde and crotonaldehyde in a ratio of between about fifteen and about twenty to one and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

8. A process according to claim 7 wherein the reaction temperature is raised, as the activity of the catalyst declines, to a value not exceeding 80° C.

9. A continuous process for the production of butyraldehyde which comprises introducing hydrogen into a recirculating reaction system containing a liquid reaction mixture comprising crotonaldehyde, butyraldehyde, water, a nickel catalyst and butanol whilst maintaining the temperature of the reaction mixture below 60° C., continuously feeding into the reaction system both wet crotonaldehyde containing more water than could be retained in solution in said liquid reaction mixture in the absence of butanol and said butanol in such proportions that the circulating reaction mixture remains substantially constant in composition, contains mainly butyraldehyde and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

10. A continuous process for the production of butyraldehyde which comprises introducing hydrogen into a recirculating reaction system containing a liquid reaction mixture comprising crotonaldehyde, butyraldehyde, water, a Raney nickel type catalyst and butanol whilst maintaining the temperature of the reaction mixture below 60° C., continuously feeding into the reaction system both wet crotonaldehyde containing more water than could be retained in solution in said liquid reaction mixture in the absence of butanol and said butanol in such proportions that the circulating reaction mixture remains substantially constant in composition, contains butyraldehyde and crotonaldehyde in a ratio of between about fifteen and about twenty to one and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

11. A continuous process for the production of butyraldehyde which comprises recirculating at a temperature not exceeding 60° C. through the reactor of a recirculating reaction system a liquid reaction mixture containing about 5% by weight of n-butanol and the rest mainly butyraldehyde, said reaction mixture containing a finely-divided nickel catalyst in suspension and continuously feeding crotonaldehyde saturated with water, n-butanol and hydrogen into the reactor in such proportions as to obtain about 95% conversion of the crotonaldehyde feed and to maintain the composition of said reaction mixture substantially constant whilst withdrawing from said reaction system through a filter sufficient reaction mixture, substantially free from catalyst, to maintain the volume of liquid in said reaction system substantially constant.

12. A process according to claim 11 wherein the reaction temperature is raised, as the activity of the catalyst declines, to a value not exceeding 80° C.

13. A process according to claim 11 wherein a filter aid is present in the liquid reaction mixture in an amount of about 5% by weight thereof.

14. A continuous process for the production of butyraldehyde which comprises recirculating at a temperature not exceeding 60° C. through the narrow tubular reactor of a recirculating reaction system a liquid reaction mixture containing about 5% by weight of crotonaldehyde, about 10% by weight of water, about 15% by weight of n-butanol and the rest mainly butyraldehyde, said reaction mixture containing a finely-divided nickel catalyst in suspension and continuously feeding crotonaldehyde saturated with water, n-butanol and hydrogen into the narrow tubular reactor in such proportions as to obtain about 95% conversion of the crotonaldehyde feed and to maintain the composition of said reaction mixture substantially constant whilst withdrawing from said reaction system through a filter sufficient reaction mixture, substantially free from catalyst, to maintain the volume of liquid in said reaction system substantially constant.

15. A continuous process for the production of butyraldehyde which comprises pumping a liquid reaction mixture containing about 5% by weight of crotonaldehyde, about 10% by weight of water, about 15% by weight of n-butanol and the rest mainly butyraldehyde, said reaction mixture containing a finely-divided nickel catalyst in suspension at a temperature not exceeding 60° C. and at high velocity through the narrow tubular reactor of a recirculating reaction system and continuously feeding crotonaldehyde saturated with water, n-butanol and hydrogen into the reactor in such proportions as to obtain about 95% conversion of the crotonaldehyde feed and to maintain the composition of said reaction mixture substantially constant whilst withdrawing from said reaction system through a filter sufficient reaction mixture, substantially free from catalyst, to maintain the volume of liquid in said reaction system substantially constant.

16. A continuous process for the production of butyraldehyde which comprises pumping, at a high rate of linear flow and at a temperature not exceeding 60° C., through a narrow tubular reactor connected in a recirculating system, a liquid reaction mixture comprising crotonaldehyde, butyraldehyde, water, a nickel catalyst and an inert mutual solvent for crotonaldehyde, butyraldehyde and water, continuously feeding into said reactor both wet crotonaldehyde containing more water than could be retained in solution in said liquid reaction mixture in the absence of said inert mutual solvent and said inert mutual solvent in such proportions that the circulating reaction mixture remains substantially constant in composition, contains mainly butyraldehyde and retains the water dissolved therein and continuously withdrawing, through a filter, part of the liquid reaction mixture, substantially free from catalyst, at such a rate that the concentration of crotonaldehyde in the liquid reaction mixture does not exceed 10% by weight, the catalyst being maintained suspended in the liquid reaction mixture within the reactor of said reaction system.

THOMAS BEWLEY.
JOHN ALFRED KEEBLE.

REFERENCES CITED

The following references are of record in the file of this patent:

UNITED STATES PATENTS

| Number | Name | Date |
|---|---|---|
| 1,724,761 | Holden | Aug. 13, 1929 |
| 1,730,587 | Mugdan | Oct. 8, 1929 |
| 1,788,896 | Swallen | Jan. 13, 1931 |
| 2,042,303 | Frolich | May 26, 1936 |
| 2,150,158 | Gallagher | Mar. 14, 1939 |
| 2,150,270 | Durrans et al. | Mar. 14, 1939 |